United States Patent
Hsiao et al.

(10) Patent No.: US 7,092,209 B2
(45) Date of Patent: Aug. 15, 2006

(54) LONGITUDINAL MAGNETIC RECORDING USING MAGNETIC MEDIA WITH A SOFT UNDERLAYER

(75) Inventors: Wenchien David Hsiao, San Jose, CA (US); Vladimir R. Nikitin, Campbell, CA (US); Adam D. Polcyn, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 332 days.

(21) Appl. No.: 10/791,431

(22) Filed: Mar. 1, 2004

(65) Prior Publication Data

US 2005/0190478 A1     Sep. 1, 2005

(51) Int. Cl.
G11B 5/66      (2006.01)
G11B 5/64      (2006.01)
G11B 5/667     (2006.01)
D04D 7/06      (2006.01)

(52) U.S. Cl. .................. 360/135; 360/55; 360/125; 360/126

(58) Field of Classification Search .............. 360/55, 360/135, 234.3
See application file for complete search history.

(56) References Cited

U.S. PATENT DOCUMENTS

| | | | |
|---|---|---|---|
| 4,949,207 A * | 8/1990 | Lazzari | 360/119 |
| 5,140,578 A | 8/1992 | Tohkairin | |
| 5,176,965 A | 1/1993 | Mallary | |
| 5,750,270 A * | 5/1998 | Tang et al. | 428/611 |
| 5,879,783 A * | 3/1999 | Chang et al. | 428/141 |
| 6,280,813 B1 | 8/2001 | Carey et al. | |
| 6,320,725 B1 * | 11/2001 | Payne et al. | 360/125 |
| 6,495,252 B1 | 12/2002 | Richter et al. | |
| 6,524,730 B1 | 2/2003 | Chen | |
| 6,531,202 B1 | 3/2003 | Litvinov et al. | |
| 6,583,958 B1 * | 6/2003 | Suzuki et al. | 360/135 |
| 6,636,371 B1 * | 10/2003 | Komatsu et al. | 360/16 |
| 6,709,773 B1 | 3/2004 | Chang et al. | |
| 6,753,072 B1 | 6/2004 | Chen et al. | |
| 2001/0051288 A1 * | 12/2001 | Iwasaki et al. | 428/694 TM |
| 2002/0149876 A1 | 10/2002 | Sakata et al. | |
| 2003/0043490 A1 * | 3/2003 | Clinton et al. | 360/55 |
| 2004/0234818 A1 * | 11/2004 | Tanahashi et al. | 428/694 TM |
| 2004/0240107 A9 * | 12/2004 | Khizroev et al. | 360/125 |

FOREIGN PATENT DOCUMENTS

| | | | |
|---|---|---|---|
| EP | 1378893 A1 * | 1/2004 | |
| EP | 1533817 A2 * | 5/2005 | |
| JP | 61198485 | 9/1986 | |
| JP | 63152007 A * | 6/1988 | |
| JP | 2005026451 A * | 1/2005 | |
| JP | 2005302238 A * | 10/2005 | |

* cited by examiner

Primary Examiner—William Korzuch
Assistant Examiner—Matthew Kayrish
(74) Attorney, Agent, or Firm—G. Marlin Knight

(57) ABSTRACT

A method of longitudinal recording using a medium with a magnetically soft underlayer is described. The method includes lowering the longitudinal coercivity in a magnetic domain in the magnetic recording medium by generating a vertical component of magnetic flux in the magnetic recording medium and writing a longitudinal orientation in the magnetic domain in the magnetic recording medium by generating a larger horizontal component of magnetic flux in the magnetic recording medium using the write head. Optionally the method further includes magnetically saturating the magnetically soft underlayer after lowering the longitudinal coercivity to limit the vertical component of the magnetic flux. The recording medium has a magnetic recording layer, a spacer layer and a soft underlayer. In one embodiment the soft underlayer is an antiferromagnetically coupled magnetic layer stack with two soft magnetic layers separated by a non-magnetic spacer layer selected to achieve the antiferromagnetic coupling.

18 Claims, 2 Drawing Sheets

LONGITUDINAL MAGNETIC RECORDING USING MAGNETIC MEDIA WITH A SOFT UNDERLAYER

FIELD OF THE INVENTION

The invention relates to magnetic recording media for longitudinal recording and more particularly to means for controlling the magnetic flux flow in the media during recording.

BACKGROUND OF THE INVENTION

A typical prior art a disk drive system 10 is illustrated in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded.

The conventional disk 16 consists of substrate 26 of AlMg with an electroless coating of NiP which has been highly polished. Glass is also commonly used for the substrate 26. The thin films 21 on the disk 16 typically include a chromium or chromium alloy underlayer which is deposited on the substrate 26. The ferromagnetic layer in the thin films is based on various alloys of cobalt, nickel and iron. For example, a commonly used alloy is CoPtCr. Additional elements such as tantalum and boron are often used in the magnetic alloy. A protective overcoat layer is used to improve wearability and corrosion. The three film disk described above does not exhaust the possibilities. Various seed layers, multiple underlayers and laminated magnetic films have all been described in the prior art. In a disk drive using perpendicular recording the recording head is designed to direct magnetic flux through the recording layer in a direction which is perpendicular to the plane of the disk. Typically the disk for perpendicular recording has a hard magnetic recording layer and a magnetically soft underlayer. During recording operations using a single-pole type head, magnetic flux is directed from the main pole of the recording head perpendicularly through the hard magnetic recording layer, then into the plane of the soft underlayer and back to the return pole in the recording head.

U.S. Pat. No. 6,531,202 to Litvinov, et al. is an example of a magnetic recording medium for perpendicular or vertical recording. The medium includes a a magnetically soft underlayer deposited on the substrate. Suitable soft magnetic materials for the underlayer are said to include CoFe and alloys thereof, FeAlN, NiFe, CoZrNb and FeTaN, with CoFe and FeAlN being preferred soft materials. A magnetically hard recording layer is deposited on the soft underlayer. Suitable hard magnetic materials for the recording layer are said to include multilayers of Co/Pd or Co/Pt, L10 phases of CoPt, FePt, CoPd and FePd and hcp Co alloys, with such multilayers and L10 phases being preferred hard materials.

In contrast to perpendicular recording, longitudinal recording media typically uses a non-magnetic underlayer under the ferromagnetic recording layer. Typical underlayer materials are chromium and various alloys of chromium. In order to maintain thermal stability for long duration storage of data, the coercivity of the magnetic recording layer must be kept high. High coercivity, in turn, places large demands on the field generated by the write head and results in poor overwriting (OW) and poor field gradients. The field generated by the write head can be the limiting factor for increasing recording density.

In U.S. Pat. No. 6,524,730 to Ga-Lane Chen a soft magnetic underlayer for vertical recording is referred as "keeper layer". The soft underlayer is said to give better writing efficiency by pulling the magnetic flux down from the writing pole of a head of the magnetic recording medium. Examples given of soft magnetic materials are NiFe, CoZrNb, FeAlNx. A particular problem with a NiFe soft underlayer is that the thickness required results in an unacceptable surface roughness. The patent describes a process for thick NiFe deposition that can reduce surface roughness of thin films. The presence of interstitial nitrogen in a soft magnetic layer is claimed to greatly reduce the surface roughness of the soft magnetic layer as compared to another soft magnetic layer without interstitial nitrogen. Interstitial nitrogen is different from nitrogen in the material forming the soft magnetic layer.

In U.S. Pat. No. 6,495,252 to Richter, et al., a recording medium with a superparamagnetic underlayer is described and asserted to solve problems arising from the generation of Barkhausen noise in magnetic recording media employing magnetically soft underlayers, e.g., of NiFe (Permalloy). According to the specification, high bit density magnetic recording, storage, and retrieval media of either perpendicular or longitudinal type substantially free of Barkhausen noise are fabricated by substituting a layer or film of a very finely grained (i.e., polycrystalline), magnetically soft material for the continuous, magnetically soft films or layers conventionally utilized as underlayers. The grain size of the ferromagnetic or ferrimagnetic material utilized for the magnetically soft underlayer is sufficiently small, such that the grains thereof become superparamagnetic, i.e., they remain magnetically ordered but lose their hysteresis. Although Richter, et al. assert that the described media can be used for longitudinal recording, every example given is for perpendicular recording. No mention is made as to how the media should be changed to function in longitudinal recording.

In U.S. Pat. No. 6,280,813 to Carey, et al. a layer structure is described that includes at least two ferromagnetic films antiferromagnetically coupled together across a nonferromagnetic coupling/spacer film. In general, it is said that the exchange coupling oscillates from ferromagnetic to antiferromagnetic with increasing coupling/spacer film thickness and that the preferred 6 angstrom thickness of the ruthenium coupling/spacer layer was selected because it corresponds to the first antiferromagnetic peak in the oscillation for the particular thin film structure. Materials that are appropriate for use as the nonferromagnetic coupling/spacer films include ruthenium (Ru), chromium (Cr), rhodium (Rh), iridium (Ir), copper (Cu), and their alloys. Because the magnetic moments of the two antiferromagnetically coupled films are oriented antiparallel, the net remanent magnetization-thickness product (Mrt) of the recording layer is the difference in the Mrt values of the two ferromagnetic films. This reduction in Mrt is accomplished without a reduction in the thermal stability of the recording medium because the volumes of the grains in the antiferromagnetically coupled films add constructively. An embodiment of the structure includes two ferromagnetic CoPtCrB films, separated by a Ru spacer film having a thickness selected to maximize the antiferromagnetic exchange coupling between the two CoPtCrB films. The top ferromagnetic layer is designed to have a greater Mrt than the bottom ferromagnetic layer, so that the net moment in zero applied magnetic field is low, but nonzero. The Carey '813 patent also states that the antiferromagnetic coupling is enhanced by a thin (5 Angstroms) ferromagnetic cobalt interface layer added between the coupling/spacer layer and the top and/or bottom ferromagnetic layers.

SUMMARY OF THE INVENTION

A method of longitudinal recording using a medium with a magnetically soft underlayer is described. The method includes lowering the longitudinal coercivity in a magnetic domain in the magnetic recording medium by generating a vertical component of magnetic flux in the magnetic recording medium using the write head and writing a longitudinal orientation in the magnetic domain in the magnetic recording medium by generating a larger horizontal component of magnetic flux in the magnetic recording medium using the write head. The lowering of the longitudinal coercivity is achieved using a longitudinal write head and a magnetically soft underlayer to guide the magnetic flux through the magnetic recording medium at an angle having a vertical component and a horizontal component with the vertical component being smaller than the horizontal component. Optionally the method further includes magnetically saturating the magnetically soft underlayer after lowering the longitudinal coercivity to limit the vertical component of the magnetic flux.

The recording medium according to the invention has a magnetic recording layer, a spacer layer and a soft underlayer that may be a single layer or a plurality of layers. The preferred crystallographic orientation of the magnetic recording layer is optimized for longitudinal recording using known principles. The soft underlayer and the associated spacer layer are designed to increase the vertical component of the magnetic field generated by the write head and still provide a strong longitudinal component to dominate the write operation. In a device according to the invention it is the longitudinal field, not the vertical field component, which writes the magnetic orientation for the bit domain in the magnetic recording layer. The vertical magnetic field acts to lower the dynamic coercivity of the recording layer to allow a weaker longitudinal magnetic field to write the bit. The invention allows the coercivity of magnetic recording layer in the absence of the vertical field to be sufficiently high to maintain thermal stability despite extremely small grain size. In one embodiment the soft underlayer is an antiferromagnetically coupled magnetic layer stack with two soft magnetic layers separated by a non-magnetic spacer layer selected to achieve the antiferromagnetic coupling.

DETAILED DESCRIPTION OF THE INVENTION AND THE PREFERRED EMBODIMENTS

Figure 1:
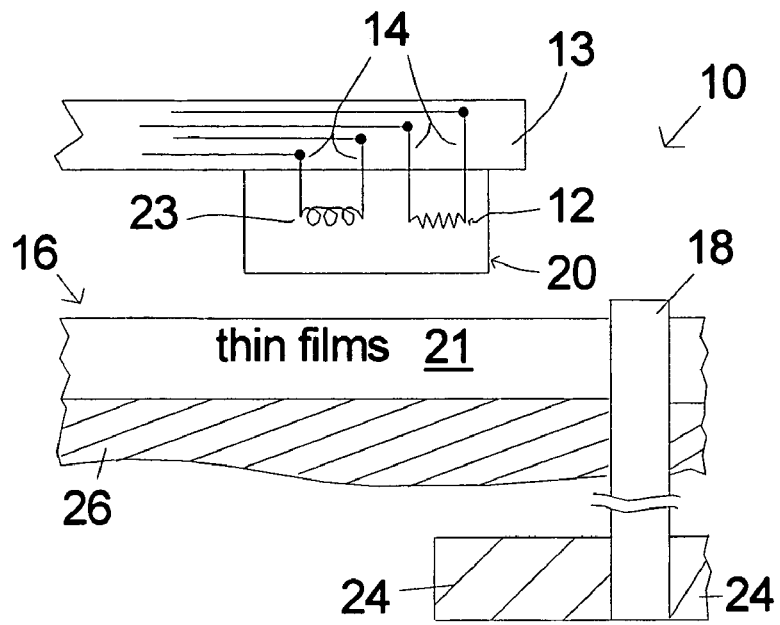
FIG. 1 is an illustration of selected components of a prior art disk drive in which the invention can be embodied.
Figure 2:
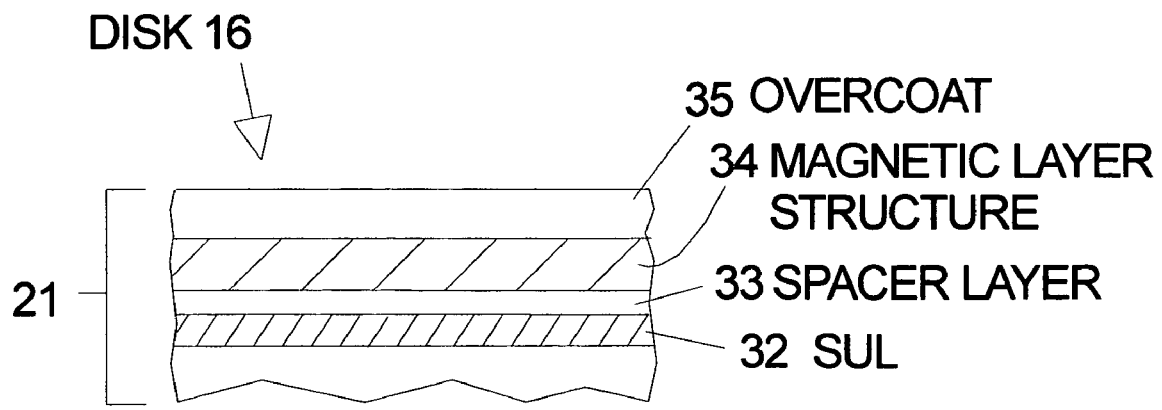
FIG. 2 is an illustration of selected layers in a thin film disk according to the invention which includes soft underlayer.

The soft underlayer of the invention can be used with a variety of magnetic recording layers and layer stacks, as well as, a variety of head designs for longitudinal recording. Except where noted below the soft underlayer of the invention can be used with any longitudinal recording head and with any longitudinal magnetic recording layer design. FIG. 2 illustrates an embodiment of a disk 16 according to the invention. The soft underlayer 32 is separated from the magnetic layer structure 34 by a non-magnetic spacer layer 33. The magnetic layer structure 34 is where the magnetic bits are recorded. The magnetic layer structure 34 can be a single layer of magnetic material or a plurality of layers which are know for use in longitudinal recording. A protective overcoat 35 is the last thin film on the disk. Many soft magnetic materials are known and can serve as the underlayer. Essentially any magnetic material that is not "hard" is a candidate for use in the soft underlayer. A preferred material is NiFe (permalloy) which is used extensively in magnetic recording heads.

Figure 4:
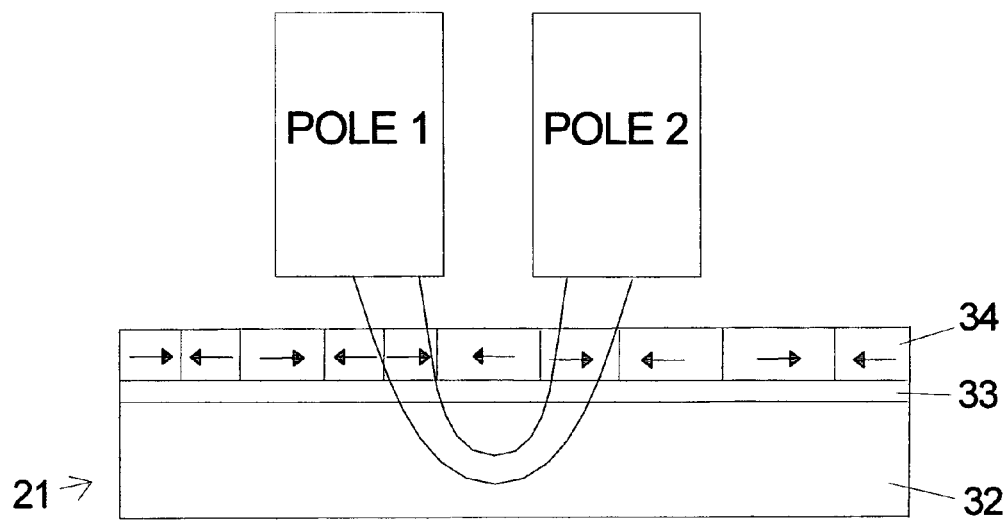
FIG. 4 is an illustration of the magnetic field lines during a write operation by a magnetic recording head and a magnetic medium according to the invention.

FIG. 4 illustrates a write operation by the poles of write head acting on the thin films 21 on a disk 16 according to the invention. The flux lines pass through the magnetic layer structure 34 at an angle containing a significant vertical component. The soft underlayer 32 is designed to increase the vertical component of the magnetic field generated by the write head, but unlike perpendicular recording, it is the longitudinal field, not the vertical field component, which writes the magnetic orientation for the bit domain in the magnetic recording layer. There is a trade-off between the vertical and longitudinal field; therefore, increasing the vertical field weakens the longitudinal field. The soft underlayer is designed to increase the vertical field by an amount which does not excessively lower the longitudinal field.

The invention is exploiting magnetization dynamics described by the Landau-Gilbert formula:

$$dM/dt = \gamma^*(M \times H) + [\text{damping term}]$$

which indicates that that the change in magnetization is largest when the applied field is perpendicular to the original magnetization. The soft underlayer uses this principle by increasing the vertical field. An alternative description is that the dynamic coercivity is reduced during the writing process. This allows the static coercivity to be large enough to provide good thermal stability and not place an excessive requirement on the write field generated by the head.

The longitudinal field generated by the write head must be larger than the vertical field for the domains to be oriented longitudinally; therefore, the vertical field must be carefully controlled. One factor in this control is the thickness of the soft underlayer which is selected to ensure saturation early enough to prevent an excessive decrease in the longitudinal field. A preferred range of thicknesses is from 1 to 100 nm. Since the soft underlayer grain structure and size can epitaxially influence the grains of the spacer layer and in turn the recording layer, the soft underlayer should not be so thick that the grain size becomes uncontrolled.

The thickness of the non-magnetic spacer layer is another factor in the control of the vertical field. Larger separation between the recording layer and the soft underlayer will decrease the effect of the soft underlayer. The non-magnetic spacer layer also serves to decouple the soft underlayer from the magnetic recording layer(s) and, therefore, tends to decrease the noise that would otherwise be contributed by the soft underlayer.

Figure 3:
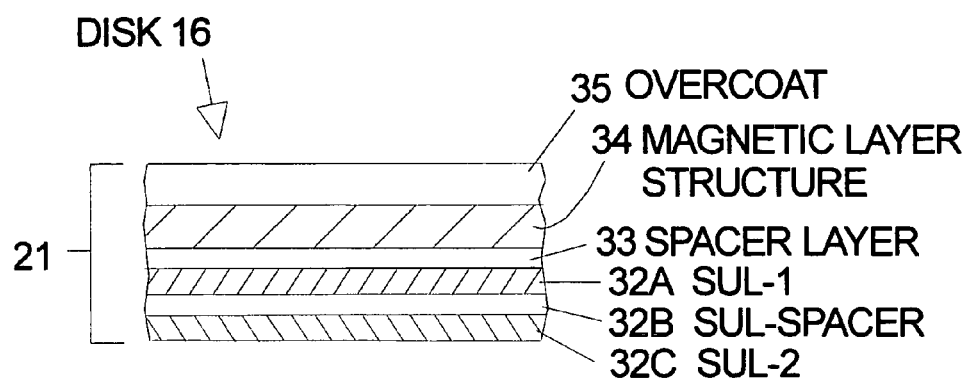
FIG. 3 is an illustration of selected layers in a thin film disk according to the invention which includes an antiferromagnetically coupled soft underlayer structure.

FIG. 3 illustrates the layers in an embodiment of the invention in which the soft underlayer can be an antiferromagnetically coupled layer stack. A preferred embodiment of this structure comprises two layers of soft magnetic material 32A, 32C, such NiFe, separated by a non-magnetic spacer layer 32B, such as ruthenium. The antiferromagnetically coupling is achieved by selecting the proper thickness of the spacer layer according to know principles. The upper and lower magnetic layers need not be the same material or the same thickness.

A thin film disk according to the invention can be fabricated using standard thin film fabrication techniques. The invention has been described with respect to particular embodiments, but other uses and applications for the ferromagnetic structure according to the invention will be apparent to those skilled in the art.

The invention claimed is:

1. A method for magnetically recording information in a magnetic recording medium that includes a magnetic recording layer:
    placing a write head in proximity to the magnetic recording medium;
    lowering a longitudinal coercivity in a magnetic domain in the magnetic recording layer by generating a vertical component of magnetic flux in the magnetic recording medium using the write head, the vertical component extending from the write head to a magnetically soft underlayer disposed under the magnetic recording layer; and
    writing a longitudinal orientation in the magnetic domain in the magnetic recording layer by generating a horizontal component of magnetic flux in the magnetic recording layer using the write head.

2. The method of claim 1 wherein the step of lowering a longitudinal coercivity further comprises using a magnetically soft underlayer, that is located under the magnetic recording layer and separated from the magnetic recording layer by a spacer layer, to guide the magnetic flux through the magnetic recording layer at an angle having a vertical component and a horizontal component with the vertical component being smaller than the horizontal component.

3. The method of claim 2 further comprising magnetically saturating the magnetically soft underlayer after lowering the longitudinal coercivity.

4. The method of claim 2 wherein the magnetically soft underlayer is NiFe.

5. A method for magnetically recording information in a magnetic recording medium that includes a magnetic recording layer:
    placing a write head in proximity to the magnetic recording medium;
    generating magnetic flux in the magnetic recording medium using the write head;
    guiding the magnetic flux through the magnetic recording layer at an angle having a vertical component and a horizontal component with the vertical component being smaller than the horizontal component, the vertical component lowering a dynamic coercivity of a selected region of the magnetic recording layer and the horizontal component writing a longitudinal orientation in the selected region.

6. The method of claim 5 wherein the step of guiding the magnetic flux through the magnetic recording medium uses a magnetically soft underlayer located under the magnetic recording medium and separated from the magnetic recording medium by a spacer layer.

7. The method of claim 6 further comprising saturating the magnetically soft underlayer before the horizontal component writes the longitudinal orientation in the selected region.

8. The method of claim 6 wherein the magnetically soft underlayer is NiFe.

9. A thin film magnetic recording medium for use with a longitudinal write head comprising:
    a magnetic recording layer for longitudinal recording with an easy axis of magnetization in the plane of the layer;
    a non-magnetic spacer layer;
    a magnetically soft underlayer and
    wherein a thickness of the magnetically soft underlayer and a thickness of the non-magnetic spacer layer are designed to guide magnetic flux from the longitudinal write head through the magnetic recording layer at an angle having a vertical component and a horizontal component with the horizontal component being larger than the vertical component.

10. The thin film magnetic recording medium of claim 9 wherein the magnetically soft underlayer is designed to saturate before a maximum flux from the longitudinal write head is reached.

11. The thin film magnetic recording medium of claim 9 wherein the magnetically soft underlayer further comprises first and second soft magnetic layers separated by a non-magnetic spacer layer selected to achieve the antiferromagnetic coupling between the first and second soft magnetic layers.

12. The thin film magnetic recording medium of claim 9 wherein the magnetically soft underlayer is NiFe.

13. The thin film magnetic recording medium of claim 9 wherein the magnetically soft underlayer is from 1 to 100 nm thick.

14. A disk drive system comprising:
    a longitudinal write head;
    means for positioning the longitudinal write head in proximity with selected locations on a disk; and
    a magnetic thin film magnetic recording medium on the disk including a magnetic recording layer for longitudinal recording with an easy axis of magnetization in the plane of the layer, a non-magnetic spacer layer, a magnetically soft underlayer and wherein a thickness of the magnetically soft underlayer and a thickness of the non-magnetic spacer layer are designed to guide magnetic flux from the longitudinal write head through the magnetic recording layer at an angle having a vertical component and a horizontal component with the horizontal component being larger than the vertical component.

15. The disk drive system of claim 14 wherein the magnetically soft underlayer saturates before a maximum flux from the longitudinal write head is reached.

16. The disk drive system of claim 14 wherein the magnetically soft underlayer further comprises first and second soft magnetic layers separated by a non-magnetic spacer layer with the first and second soft magnetic layers being antiferromagnetically coupled.

17. The disk drive system of claim 14 wherein the magnetically soft underlayer is NiFe.

18. The disk drive system of claim 14 wherein the magnetically soft underlayer is from 1 to 100 nm thick.

* * * * *